United States Patent [19]

von Bonin et al.

[11] 4,148,844

[45] Apr. 10, 1979

[54] POLYMERIZATION PRODUCTS CONTAINING POLYCARBODIIMIDES AND VINYL MONOMERS

[75] Inventors: Wulf von Bonin, Leverkusen; Lothar Preis, Cologne; Ulrich von Gizycki, Leverkusen, all of Fed. Rep. of Germany

[73] Assignee: Bayer Aktiengesellschaft, Fed. Rep. of Germany

[21] Appl. No.: 800,028

[22] Filed: May 24, 1977

[30] Foreign Application Priority Data

May 29, 1976 [DE] Fed. Rep. of Germany ....... 2624198

[51] Int. Cl.$^2$ ...................... C08L 79/00; C08L 67/00
[52] U.S. Cl. .................................... 260/874; 260/823; 260/859 R; 260/860; 428/288; 528/44
[58] Field of Search ......................... 260/874, 823, 860

[56] References Cited

U.S. PATENT DOCUMENTS

| | | | |
|---|---|---|---|
| 3,639,353 | 2/1972 | Brown | 260/77.5 R |
| 3,963,801 | 6/1976 | Su | 260/873 |
| 4,010,222 | 3/1977 | Shih | 260/873 |
| 4,042,558 | 8/1977 | Bonin | 260/859 R |

FOREIGN PATENT DOCUMENTS 1056202 1/1967 United Kingdom.

*Primary Examiner*—Paul Lieberman
*Attorney, Agent, or Firm*—Connolly and Hutz

[57] ABSTRACT

Heat-curable casting resins comprising a mixture of a polycarbodiimide and a copolymerizable vinyl monomer.

5 Claims, No Drawings

POLYMERIZATION PRODUCTS CONTAINING POLYCARBODIIMIDES AND VINYL MONOMERS

The invention relates to casting resins which essentially consist of a mixture of polycarbodiimides in vinyl monomers and which cure by heating to a temperature above 40° C.

In this case, mixture also denotes molecularly disperse or colloidally disperse solutions as well as dispersions of particles swollen in the solvent.

Compounds designated as polycarbodiimides are those which have molecular weights above 300 and contain at least two carbodiimide groups per molecule.

Polycarbodiimides of this type are prepared, for example, by an intermolecular elimination of $CO_2$, preferably catalysed by compounds which contain phospholine oxide groups (or phospholane oxides, sulphides or imides, phospholine sulphides or phospholine imides), from polyfunctional isocyanates and, if appropriate, monofunctional isocyanates used conjointly. The so-called polycarbodiimides thus formed may also contain in the molecule, in addition to carbodiimide groupings, yet further reactive groups, for example isocyanate groups which may be terminal, uretone groupings and groupings which can be formed by an addition reaction of, for example, isocyanate or carbodiimide, and possibly also $CO_2$, with the carbodiimide groups in the chain. The additional appearance of these groupings in the polycarbodiimide molecule depends, in most cases, on the nature and the reaction conditions of the isocyanate or isocyanate mixture utilised for the preparation of the polycarbodiimide.

Since the polycarbodiimides which have been prepared, according to the state of the art, on the basis of polyfunctional isocyanates and, if appropriate, monofunctional isocyanates used conjointly for the purpose of oligomerisaton, for example by catalysts with 0.1 – 2% by weight of a phospholine oxide, say 1-methyl-1-oxo-phospholine, whilst stirring at 10 – 150° C., can obviously contain terminal isocyanate groups which are not fully reacted, it is advantageous, if appropriate, to eliminate these terminal groups by adding compounds which react with isocyanates. Advantageously, amines or alcohols are used for this purpose and an additional lengthening of the polycarbodiimide component can be achieved in the case that, for example, bifunctional amines or alcohols are employed. Examples of compounds which can be used to eliminate the isocyanate groups, or can be used as chain-stoppers, are water, ammonia, primary and secondary aliphatic, cyclo-aliphatic and aromatic amines, such as say methylamine, diethylamine, allylamine, cyclohexylamine, benzylamine, aniline, toluidine, ditolylamine, toluylenediamine and 4,4'-diphenylmethanediamine, or especially primary and secondary alcohols, such as methanol, ethanol, butanol, allyl alcohol, hydroxyethyl acrylate, oleyl alcohol or phenol, polyethers, polyesters or polycarbonates with lateral or terminal OH groups, ethylene glycol, propylene glycol, butanediol, hexanediol, ethanolamine, diethanolamine, or triethanolamine. In general, these compounds are added in amounts which are equivalent to the residual isocyanate groups; however, for special purposes of application, say adhesives, it is also of interest to use lesser amounts, say 0.1 – 0.8 equivalents, whilst larger added amounts are rarely indicated since they frequently effect an undesired plasticisation of the polymerisation products.

In many cases, however, the carbodiimidisation reaction can be carried out up to complete conversion of the NCO groups so that the procedure described above is superfluous.

Furthermore, it is frequently not necessary completely to remove small residual isocyanate contents.

The polycarbodiimides being employed are preferably prepared by carbodiimidising polyfunctional, preferably bifunctional, aliphatic, araliphatic or especially aromatic isocyanates. A conjoint use of monofunctional isocyanates or trifunctional and more highly functional isocyanates as chain stoppers or branching agents for the polycarbodiimides can be considered, in which case the amount of more than bifunctional isocyanates should, however, be below 50 percent by weight, preferably below 15 percent by weight, of the total amount of isocyanate, whilst monofunctional isocyanates can, if appropriate, be used conjointly even in amounts of up to 75% by weight, preferably up to 50% by weight, it being possible to obtain polycarbodiimides of particularly low viscosity.

Polycarbodiimides in the sense of the invention can also be obtained by polycarbodiimidising mixtures of trifunctional and/or more highly functional isocyanates with monoisocyanates.

For example, the following isocyanates can be utilised for the desired purpose: alkyl isocyanates, such as methyl, allyl, butyl and stearyl isocyanate; alkyl diisocyanates, such as ethylene diisocyanate, tetramethylene diisocyanate, hexamethylene diisocyanate and isophorone diisocyanate, but preferably aromatic monofunctional or bifunctional isocyanates, such as phenyl isocyanate, phenylene diisocyanates, the isomeric toluylene diisocyanates, the isomeric diphenylmethane diisocyanates, dimethyldiphenylmethane diisocyanates and technical mixtures of diphenylmethane diisocyanates, which optionally can also contain polynuclear diisocyanates or trifunctional isocyanates.

Preferably, the isocyanates which can be used are hexamethylene diisocyanate, isophorone diisocyanate and especially the toluylene diisocyanates and diphenylmethane diisocyanates. The isomers of toluylene diisocyanate are here of particular interest. Phenyl isocyanate should be particularly singled out as a chain stopper.

Those isocyanates can also be used which, according to the state of isocyanate chemistry, are accessible from polyfunctional isocyanates by trimerisation, formation of uretdiones, allophanatisation, biuretisation or partial reaction with amines or alcohols.

In principle, it is thus also possible to use, or use conjointly, those polyfunctional isocyanates which are formed by reacting excess diisocyanate with monofunctional, bifunctional or polyfunctional compounds carrying OH groups or NH groups and which can be encountered in industrial polyurethane chemistry either under the name of modified isocyanate or isocyanate prepolymer. The inclusion of such modified polyisocyanates into the present process provides further scope for varying the process depending on the choice of chain length or of the chemical nature of the polyfunctional OH compounds and NH compounds, for example polyethers, polycarbonates or polyesters.

The vinyl compounds which can be used are aliphatic or aromatic polymerisable vinyl monomers. These include, for example, esters of vinyl alcohol or esters of acrylic acid or methacrylic acid, such as vinyl acetate, vinly propionate, vinyl benzoate or the methyl, ethyl, propyl, (iso)-butyl or cyclohexyl esters or the glycol or glycerol esters of acrylic acid and methacrylic acid, and also acrylonitrile and methacrylonitrile, acrylic acid and methacrylic acid dialkylamides, methylene-bis-acrylamide, maleic acid esters or fumaric acid esters, maleic acid N-alkylamides, maleimides, vinyl pyrrolidone and vinyl halides, such as vinyl chloride and vinylidene chloride, but in particular vinyl aromatic compounds, such as isopropenylphenol and its esters or ethers, α-methylstyrene, vinyltoluene, and p-chlorostyrene, but above all styrene and/or divinylbenzene.

The only restriction on the amounts of polycarbodiimide and vinyl compounds in the casting resin according to the invention is that these liquid mixtures must be processable. For example, they must be capable of taking up fillers, of penetrating fibre mats and of being cast; they must be workable at least under pressure and heat. Accordingly, the vinyl monomer preferably amounts to 0.1 to 95, more preferably 0.5 - 70, % by weight of the weight of the solution.

The casting resin according to the invention can be obtained, for example, by dissolving preformed polycarbodiimides in vinyl monomers or, preferably, by preparing the polycarbodiimides in situ in the vinyl monomers.

The additional conjoint use of solvents is possible but not necessary.

The casting resins according to the invention can be cured at temperatures between −25 and +280° C., preferably +10 and +180° C., by polymerization initiated by UV light, ionising radiation, for example X-ray radiation or nuclear radiation, or preferably by free-radical initiators or initiator systems, which are customary in practice and which can already be added, in full or in part, to the casting resin during the preparation or immediately before the polymerisation.

Examples of suitable initiators are organic peroxides, such as lauroyl peroxide, dibenzoyl peroxide, t-butyl hydroperoxide, cumene hydroperoxide, di-t-butyl peroxide, dicumyl peroxide, cyclohexanone peroxide, t-butyl peroctoate or combinations of such peroxides with reducing agents or co-activators, such as, for example, boron alkyls, $SO_2$ donors or amines, for example p-dimethylaminotoluene or metal salts, such as cobalt naphthenate. Azo compounds, such as azodiisobutyronitrile or azodiisobutyric acid diethyl ester, are also outstandingly suitable.

Peroxides, such as t-butyl hydroperoxide, cumene hydroperoxide or t-butyl peroctoate, prove to be particularly suitable.

The polymerisation initiators are used in amounts of 0.01 to 3%, preferably 0.1 to 1%, relative to the weight of the solution.

Frequently, an initiator is not required at all; simple heating or curing of the casting resin at temperatures of above 40° C. suffices. A pre-curing at about 80° C. with subsequent raising of the curing temperatures to 120 - 150° C. has proved very advantageous. However, the resins fully cured in this way can be heat-treated further at even higher temperatures of about 200 - 250° C.

The conjoint use of phenol or of phenolic compounds, such as 4,4′-dihydroxy-diphenyl-dimethylmethane, did not impair the thermal curing.

Surprisingly, curing can also be accelerated by compounds containing readily saponifiable or hydrolysable halogen, preferably chlorine, such as inorganic or organic acid chlorides (acetyl chloride, adipic acid chloride, benzoyl chloride, chlorides of the benzenedicarboxylic acids, that is to say phthaloyl chloride or terephthaloyl chloride, thionyl chloride, $BF_3$ or phosphorus oxychloride) or isocyanidedichlorides, such as perchloroethyl isocyanide-dichloride and trichloroethyl isocyanide-dichloride, it being possible in some cases to dispense with radical-forming agents. These accelerators and classes of compounds are preferably employed in amounts from 0.01 to 50, preferably 0.3 to 10, % by weight at temperatures between 20 and 250° C., preferably 80 to 180° C.

It is possible to combine different curing processes. Preferably, curing is carried out by means of heat (very low content of foreign substances); the conjoint use of, for example, halogen compounds of phosphorus gives products with an improved behaviour in fire; the combination of free radical-forming agents with the halogen compounds gives polymerisation products which have particularly few bubbles.

Since a considerable amount of heat of polymerisation can be liberated during curing, and also in order to adapt the shrinkage and the mechanical properties to the desired application, it is often advantageous to add fillers, for example in a pulverulent form or in the form of fibres, acicular crystals, flakes, balls or small hollow bodies. Examples of suitable fillers are chalk, calcium oxide, calcium hydroxide, hydrated aluminium oxide, quartz powder, glass beads, talc, graphite, types of carbon black, polymer powders, for example based on polyethylene, polypropylene, polymethyl methacrylate, polystyrene or polyvinyl acetate, glass fibres, potassium titanate, gypsum fibres, carbon fibres, steel fibres, metal powders, small gas bubbles, droplets of water, hollow glass beads and the like. Amounts of up to 300%, relative to the weight of the solution, of these fillers can be employed. Dyestuffs and making-up auxiliaries (emulsifiers, thickeners and odoriferous substances) can be incorporated, as can flame-proofing agents, for example those based on phosphorus or antimony.

The casting resins can also be combined with other resins, for example with epoxide resins, unsaturated polyester resins, maleimide resins, cyanate resins, isocyanate resins and alkyd resins. The other resins can be used conjointly in amounts of 0 - 95% by weight, preferably in amounts of less than 50% by weight.

The casting resins can be processed in the same way as unsaturated polyester resins, that is to say, for example, by casting, spreading, as a laminate with glass fibres (glass mats) and other reinforcing materials, as a prepreg or as a compression moulding composition, transfer moulding composition or foam or foamed binder for lightweight concretes.

The casting resins can be used for preparing mouldings and coatings of carriers for electronic circuit elements, insulators and casting compositions and for preparing foamed components, hollow bodies and heat shields, or impregnating wood, cardboard, textiles and non-wovens or as a binder for organic-inorganic concretes. They can also be used as an adhesive.

Curing can also be carried out in several stages, for example in accordance with the prepreg technique in which pre-cured semi-finished articles can be fully cured, whilst being finally shaped.

It is also possible to granulate material which has been pre-cured at temperatures of, for example, below 120° C. and subsequently to subject it to compression

EXAMPLE 1

280 parts of a technical mixture of toluylene diisocyanate isomers, which contains approximately 80% of the 2,4-isomer, are stirred at 120° C. for 1 hour with 120 parts of styrene and 15 parts of allyl alcohol as well as 1 part of 1-methyl-1-oxo-phospholine. Thereafter, free isocyanate can no longer be detected by amine titration in the reaction mixture. The mixture is cooled rapidly and a liquid product solution is obtained.

100 parts of this solution are stirred with 0.8 part of cumene hydroperoxide. 5 parts of benzoyl chloride are then also added and the mixture is cast in a cylindrical mould. The latter is cured at 120° C. in a heating cabinet in the course of about 4 hours. A brownish clear polymer block which is subsequently after-cured for about 2 hours at 200° C., is obtained.

The material does not distort and is hard at 200° C.

EXAMPLE 2

0.8% by weight of phosphorus oxychloride is stirred into the casting resin solution obtained in Example 1. The composition cures in the course of 4 hours at 80° C. in a cylindrical mould. It is heat-treated further at 150° C. A brown clear polymer block which does not distort and is hard, even at 200° C., is obtained.

The fact, demonstrated in Example 1 and 2, and also in some examples which follow, that polymer blocks of clear appearance are obtained, indicates that no isolated significant amounts of polystyrene are contained in the reaction product. The addition of polystyrene, dissolved in styrene, or of polystyrene powder leads to milky-turbid polymerisation products, presumably because of incompatibility.

EXAMPLE 3

250 parts of 4,4'-diphenylmethane diisocyanate, 107 parts of styrene, 30 parts of phenyl isocyanate and 4.5 parts of 1-methyl-1-oxo-phospholine are stirred at 120° C. for 30 minutes, the formation of polycarbodiimide taking place with elimination of $CO_2$. 0.5 part of t-butyl hydroperoxide and 0.5 part of $POCl_3$ are then stirred, at 65° C., into a partial amount of 100 parts of the reaction product. A non-woven of glass fibre is impregnated with the material and cured in a press at 205° C. for 5 minutes. A clear sheet which retains its rigid character, even at 200° C., is obtained.

EXAMPLE 4

280 parts of the isocyanate mixture used in Example 1, 70 parts of divinylbenzene, 50 parts of styrene, 30 parts of phenyl isocyanate and 1 part of 1-methyl-1-oxo-phospholine are stirred at 120° C. for 45 minutes. Free isocyanate is then no longer detectable by titrimetry in the reaction solution. The reaction product is cooled and processed as follows:

(a) 100 parts filled into a cylindrical mould and cured at 120° C. in the course of 5 hours. The cylinder can be after-cured at 200° C. without significant change of its dimensions. It has a clear appearance.

(b) A non-woven of glass is impregnated with the reaction solution. This non-woven is cured at 45° C. Subsequently the prepreg which has been impregnated in this way and is not tacky, is fully cured in a press at 200° C., whilst being shaped.

(c) 1 part of t-butyl peroctoate is added to 100 parts and the mixture is cured in the cylindrical mould for 1 hour at 80° C., 1 hour at 120° C. and fully at 200° C. A polymer moulding results which is hard even at 200° C.

(d) The procedure followed is as in (c) but 1 part of $POCl_3$ is employed in place of the peroxide. A clear brownish polymer moulding is formed.

(e) 100 parts of the reaction product are cured at 80° C. for 12 hours. The cured product is subsequently granulated.

The granules obtained are compression-moulded in a press at 250° C. in the course of 5 minutes, to give a sheet. The sheet has a homogeneous character.

EXAMPLE 5

200 parts of the toluylene diisocyanate used in Example 1, 200 parts of phenyl isocyanate and 4.6 parts of 1-methyl-1-oxo-phospholine are stirred at 120° C. for 45 minutes; with elimination of $CO_2$, a polycarbodiimide is formed in which isocyanate is no longer detected by titration. The reaction product represents a brownish honey-like liquid.

(a) The reaction product is filled into a cylindrical mould, stirred with 5% by weight of styrene and, after the addition of 0.5% by weight of di-t-butyl peroxide, cured at 140°C. for 12 hours. A hard polymer moulding is formed.

(b) The reaction product is stirred with 30% by weight of diallyl phthalate and 1% by weight of dicumyl peroxide and is cured in a cylindrical mould at 120° C. for 10 hours and at 150° C. for 5 hours. A hard polymer moulding is formed.

(c) The reaction product is stirred with 50% by weight of a commercially available unsaturated polyester resin, present as a solution in styrene, and with 1% by weight of benzoyl peroxide, and is cured in a cylindrical mould for 3 hours at 120, 3 hours at 140 and 3 hours at 160° C. A homogeneous hard prepolymer moulding is formed.

(d) The reaction product is mixed at 80°C. with 50% by weight of 4,4'-diphenyl-dimethylmethane diglycidyl ether, then filled into a cylindrical mould and cured for 3 hours at 120 and 10 hours at 150° C. A hard polymer moulding is formed.

The % contents indicated relate to the reaction product employed.

EXAMPLE 6

200 parts of the isocyanate used in Example 1, 200 parts of phenyl isocyanate, 172 parts of styrene and 4.6 parts of 1-methyl-1-oxo-phospholine are stirred at 120° C. for 45 minutes. Thereafter, isocyanate groups are no longer detectable by titration in the reaction product.

100 parts of the reaction product are filled into a cylindrical mould and cured at 120° C. for 8 hours. The hard moulding formed is then heat-treated at 200° C. for 5 hours, no visible change in shape being observable but merely a dark coloration.

EXAMPLE 7

300 parts of the isocyanate used in Example 1, 100 parts of styrene, 72 parts of divinylbenzene, 100 parts of phenyl isocyanate and 4.5 parts of 1-methyl-1-oxo-phospholine are stirred at 120° C. for 45 minutes.

The reaction product formed is provided in various batches with the following additives:

(a) without additive
(b) 10% by weight of limonene
(c) 1% by weight of cumene hydroperoxide
(d) 1% by weight of phosphorus oxychloride
(e) 1% by weight of cumene hydroperoxide 1% by weight of benzoyl chloride
(f) 3% by weight of thionyl chloride
(g) 1% by weight of perchloroethyl isocyanide-dichloride.

A volume of 60 ml is then filled into a cylindrical mould and cured at 120° C. for 8 hours. In all cases, a hard polymer moulding is formed which retains its shape, even without formation of bubbles, when it is subsequently heat-treated for 4 hours at 200° C. in a circulating air cabinet.

The same results are obtained by employing a reaction product which is obtained when 200 parts by weight of a commercially available technical liquid isocyanate mixture (which is obtained by phosgenation of aniline/formaldehyde condensation products), 200 parts by weight of phenyl isocyanate, 100 parts by weight of styrene, 72 parts by weight of divinylbenzene and 4 parts by weight of 1-methyl-1-oxo-phospholine are stirred at 120° C. for 45 minutes and then rapidly cooled.

What we claim is:

1. A casting resin comprising a mixture of (A) a polycarbodiimide having a molecular weight above 300, containing at least two carbodiimide groups per molecule and prepared by intermolecular elimination of carbon dioxide from a polyfunctional isocyanate and (B) 0.5 to 70% by weight, based on the weight of the mixture, of a monomer selected from the group consisting of styrene, diallylphthalate, and a mixture of styrene and divinyl benzene.

2. The casting resin of claim 1 wherein said polyfunctional isocyanate is selected from the group consisting of hexamethylene diisocyanate, diphenylmethane disocyanate, isophorone diisocyanate and at least one toluylene diisocyanate.

3. The casting resin of claim 1 which additionally contains a free radical forming initiator.

4. The casting resin of claim 3 which additionally contains a compound containing hydrolyzable halogen.

5. The casting resin of claim 1 which additionally contains a compound containing hydrolyzable halogen.